United States Patent [19]

Alex et al.

[11] 4,299,471
[45] Nov. 10, 1981

[54] SELF-DEVELOPING CAMERA BACK WITH REMOVABLE PROCESSING ASSEMBLY

[75] Inventors: James J. Alex, Haverhill; June C. Fichter, Canton, both of Mass.

[73] Assignee: Polaroid Corporation, Cambridge, Mass.

[21] Appl. No.: 142,478

[22] Filed: Apr. 21, 1980

[51] Int. Cl.³ ............................................... G03D 9/02
[52] U.S. Cl. .................................................... 354/304
[58] Field of Search ...................... 354/85, 86, 87, 303, 354/304, 312

[56] References Cited

U.S. PATENT DOCUMENTS

| | | |
|---|---|---|
| 2,933,993 | 4/1960 | Bachelder et al. |
| 3,505,939 | 4/1970 | Yow-Jiun Hu |
| 3,745,904 | 7/1973 | Bing et al. |
| 3,810,220 | 5/1974 | Paglia |
| 3,852,780 | 12/1974 | Augustin et al. |
| 3,882,518 | 5/1975 | Douglas ............................ 354/86 |
| 3,999,202 | 12/1976 | Goto ................................ 354/86 |
| 4,023,191 | 5/1977 | Augustin et al. |
| 4,075,643 | 2/1978 | Lane |
| 4,093,956 | 6/1978 | Goto ................................ 354/86 |
| 4,174,164 | 11/1979 | Friedman et al. |

*Primary Examiner*—L. T. Hix
*Assistant Examiner*—Alan Mathews
*Attorney, Agent, or Firm*—John S. Vale

[57] ABSTRACT

A self-developing camera back is provided with a film processing assembly that is removably received in a recess within a camera back housing and is releasably retained therein by a slidable retaining member that also functions as a film unit guide. The processing assembly includes a support frame, a pair of bearing block assemblies supporting a pair of pressure-applying rollers, a movable edge control bar and a spring assembly for retaining the bearing block assemblies and edge control bar in corresponding support frame receiving channels and for applying biasing forces to one of the rollers and the edge control bar.

16 Claims, 7 Drawing Figures

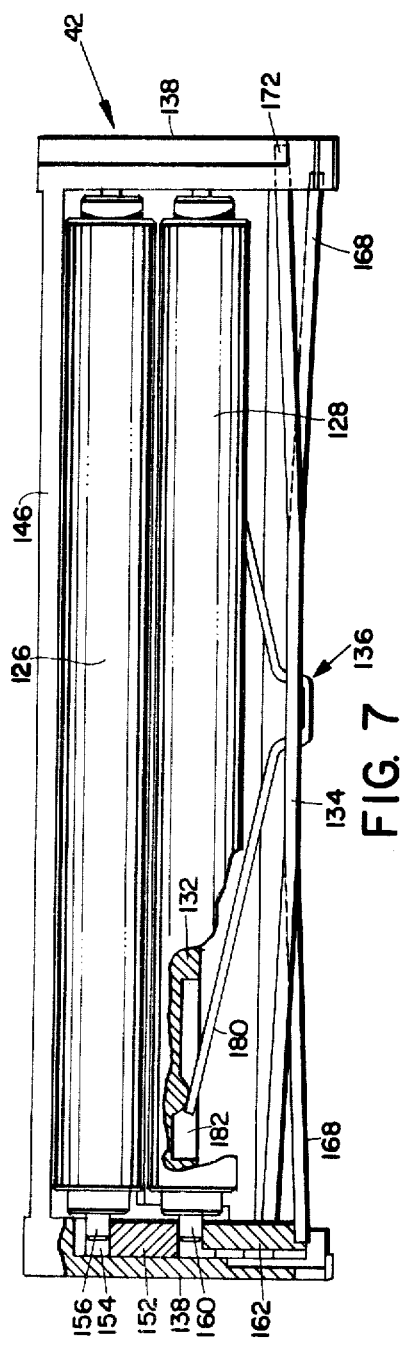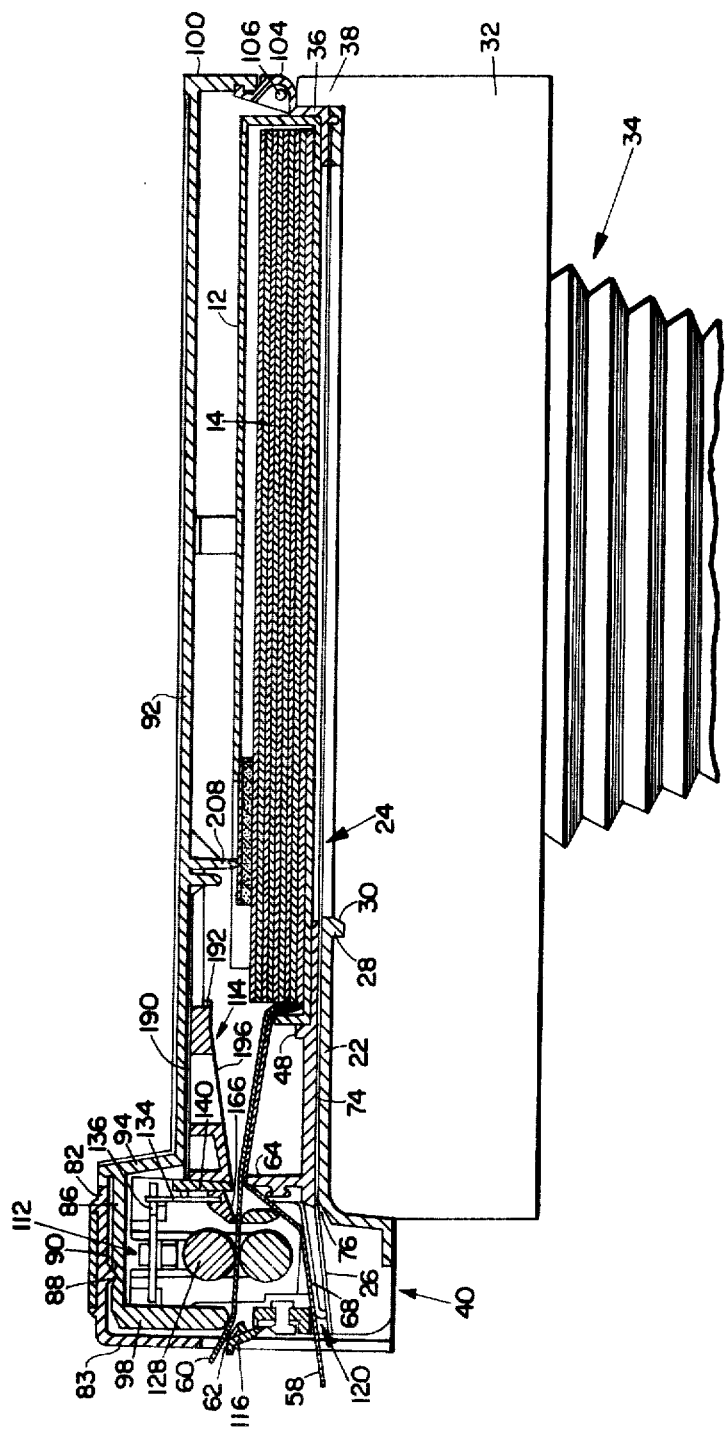

SELF-DEVELOPING CAMERA BACK WITH REMOVABLE PROCESSING ASSEMBLY

BACKGROUND OF THE INVENTION

The present invention relates to the field of photography and, more specifically, to photographic apparatus, such as a self-developing camera back for a 4×4 view camera, including a film processing assembly for effecting distribution of a fluid processing composition between superposed sheets of a self-developing film unit.

Self-developing camera backs for use with large format view cameras are, of course, well known in the prior art.

For example, Polaroid Corporation, Cambridge, Mass., presently markets a camera back designated Polaroid Land Pack Film Holder Model 405 that holds a pack of eight 107 or 108 Polaroid Land Film units. These film units have an image area of approximately 3.25"×4.25". Generally, these camera backs are used with view cameras having a similar or slightly smaller image area format.

Until recently, larger 4"×5" format self-developing film units had not been available in multiple film unit packs. Instead, these film units were packaged as single units. Therefore, self-developing 4×5 camera backs for use with 4×5 cameras heretofore have been configured to receive these single film units rather than a film pack. Examples of such 4×5 self-developing camera backs may be found in commonly-assigned U.S. Pat. Nos. 2,933,993 and 3,505,939.

Alternatively, the smaller format 405 camera back may be modified for use with a 4×5 view camera by providing an oversized adapter plate on the front thereof. However, the use of the smaller format film precludes recording the full image provided by the camera's optical system. An example of a modified 405 pack holder for use with a 4×5 view camera may be found in commonly assigned U.S. Pat. No. 3,852,780.

The camera back disclosed in this last-mentioned patent includes an elongated housing having a film withdrawal opening and pull tab slot at one end thereof. In response to pulling on a tab extending through the pull tab slot, the leader of the exposed film unit is advanced through the film withdrawal slot. In response to pulling on the leader, the exposed film unit is advanced between a pair of pressure applying rollers which release a fluid processing composition from a pod at the leading end of the film unit and distribute the fluid between superposed negative and positive sheets of the film unit. An exposure aperture in the forward wall of the camera back may be selectively blocked and unblocked by a dark slide which is pulled out from the opposite end of the housing. Because this smaller format camera back is not as long as the film holder section of a 4×5 camera, the end having the dark slide slot therein is spaced from a camera back or film holder locating stop so that the dark slide may be easily removed. However, if a camera back is suitably dimensioned to fit into the film holder section of a 4×5 camera, this positioning stop would preclude, or at least make difficult, locating the dark slide at this end of the camera back.

Because 4×5 self-developing film units are now being packaged in a multiple film unit pack, there is a need for a full size pack holding camera back that is suitable for use with most commercially available 4×5 view cameras.

The camera back disclosed in the previously-noted U.S. Pat. No. 3,852,780 employs a film processing assembly including a support frame having mounted thereon a pair of pressure-applying rollers, edge control structure for applying a compressive pressure selectably to the lateral edges of the film unit to prevent fluid leakage therefrom as the film unit is advanced through the pressure applying rollers, and a ramp-like inclined film guide for guiding the film unit toward the edge control structure and pressure-applying rollers. The film processing assembly is adapted to be snap fit into the camera back housing so as to be readily removable therefrom to facilitate cleaning the rollers.

This type of removable film processing assembly is described and shown in more detail in commonly assigned U.S. Pat. No. 3,745,904. While this film processing assembly performs well, it is generally more mechanically complex and more costly to assemble than is desirable.

Therefore, it is an object of the present invention to provide a pack holding self-developing camera back that is suitable for use in a wide variety of 4×5 view cameras.

It is another object to provide such a camera back having a dark slide arranged thereon so as not to interfere with camera back or film holder locating structure on such view cameras.

Yet another object of the invention is to provide such a camera back having a film processing assembly that is readily removable for cleaning purposes.

Another object is to provide a film processing assembly for use in such a camera back that is simple in its construction and may be easily assembled.

Other objects of the invention will, in part, be obvious and will, in part, appear hereinafter.

SUMMARY OF THE INVENTION

The present invention provides a photographic apparatus for effecting distribution of a fluid processing composition between superposed sheets of a self-developing film unit. The apparatus includes a simply constructed and easy to assemble film processing assembly that is readily removable from the apparatus to facilitate cleaning a pair of pressure-applying rollers thereon.

In a preferred embodiment, the apparatus takes the form of a self-developing camera back that is attachable to the body of a large format camera, such as a 4×5 view camera, for supporting a self-developing film unit supplied in a pack in position for exposure and for processing the film unit subsequent to exposure.

The camera back includes an elongated housing formed by pivotally connected forward and rear housing sections. The forward housing section includes a forward wall having an exposure aperture therein that may be selectively blocked and unblocked by a dark slide. A dark slide receiving channel has its open end on a leading end portion of the housing which also includes a film pull tab opening and film withdrawal opening. This construction allows the trailing end of the camera back to be seated against a camera back or film pack locating stop on a 4×5 camera.

The film processing assembly is adapted to be received and supported in an internal recess within the housing so that the pressure-applying rollers thereon extend into a path of film advancement from one end of the film pack, between the rollers, and out through the film withdrawal slot. A base section of the film processing assembly is releasably retained in the recess by a slidably movable retaining member. In a preferred embodiment, the retaining member also includes a guide surface inclined toward the film advancement path in the direction of film movement for guiding the film unit toward the edge control structure and pressure-applying rollers forming part of the processing assembly.

The processing assembly includes a support frame having a pair of laterally spaced side members joined by a cross member. Integrally formed with the cross member are a pair of laterally-spaced first edge control projections. The side members include integrally formed first and second channels having open ends. The first channels receive a pair of bearing blocks which rotatably mount the pressure-applying rollers between the side members. The bearing block structure also allows movement of one roller toward and away from the other roller to allow the thicker leading end of the film unit having the pod thereon to pass between the rollers. The second channels on the side members are adapted to receive opposite ends of an edge control bar having a second set of projections thereon which cooperate with the first projections for selectively applying a compressive pressure to edge portions of the film unit to prevent fluid leakage therefrom as the film unit is advanced through the pressure-applying rollers. The assembly further includes resilient means for retaining the bearing blocks in the first channel and biasing one roller toward the other and for retaining the edge control bar in the second set of channels and applying a biasing force thereto for urging it toward the cross member.

BRIEF DESCRIPTION OF THE DRAWINGS

FIG. 6 is a cross-sectional view of the camera back shown mounted on the body of a large format view camera; and FIG. 7 is an elevation view, partly in section, of the film processing assembly.

DESCRIPTION OF THE PREFERRED EMBODIMENT

Figure 1:
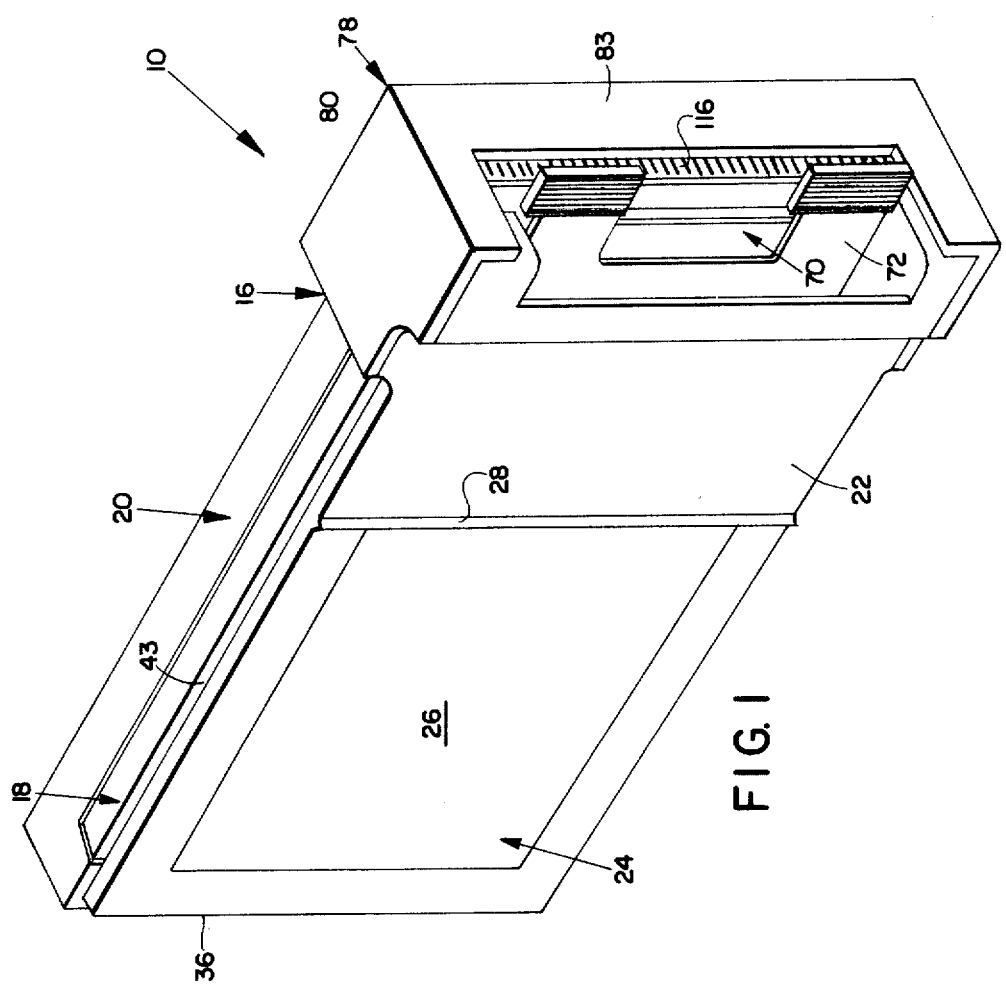
FIG. 1 is a front perspective view of the self-developing camera back embodying the present invention.
Figure 2:
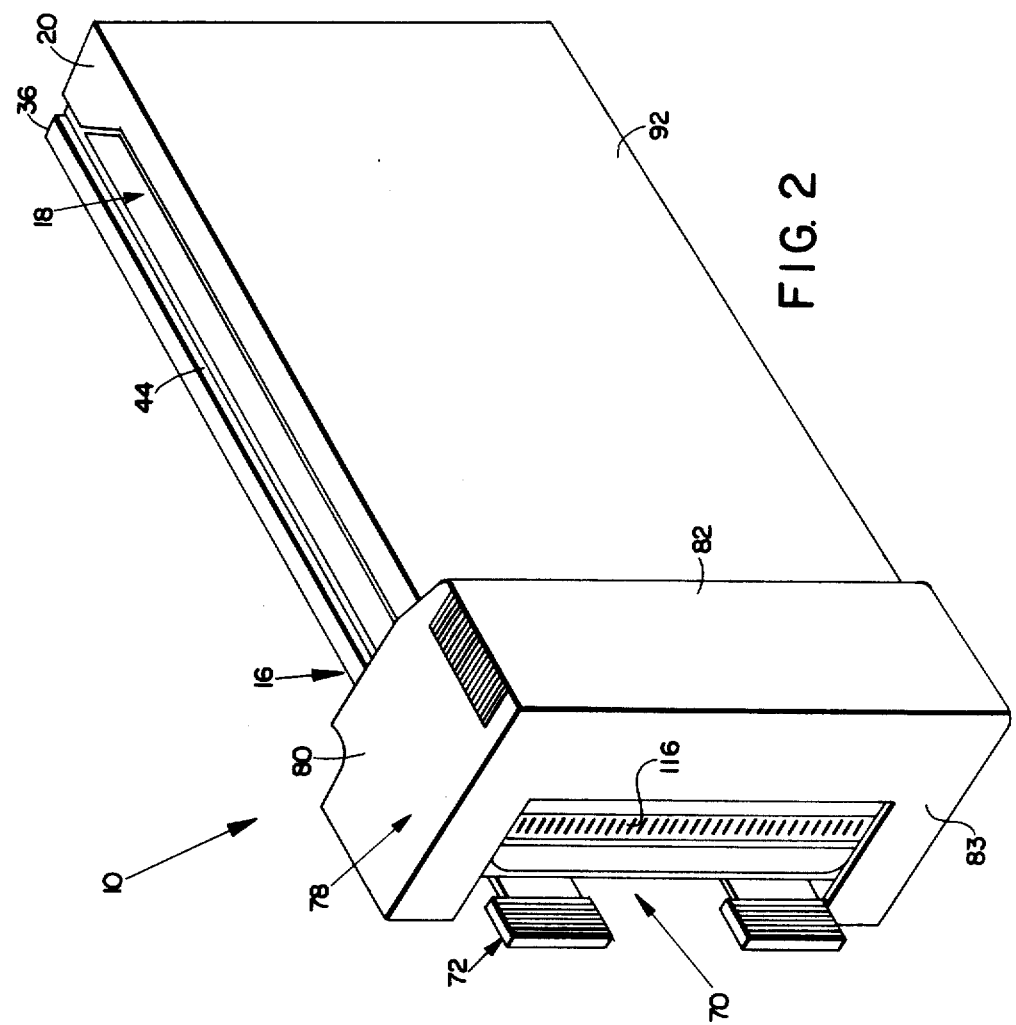
FIG. 2 is a rear perspective view of the camera back.
Figure 3:
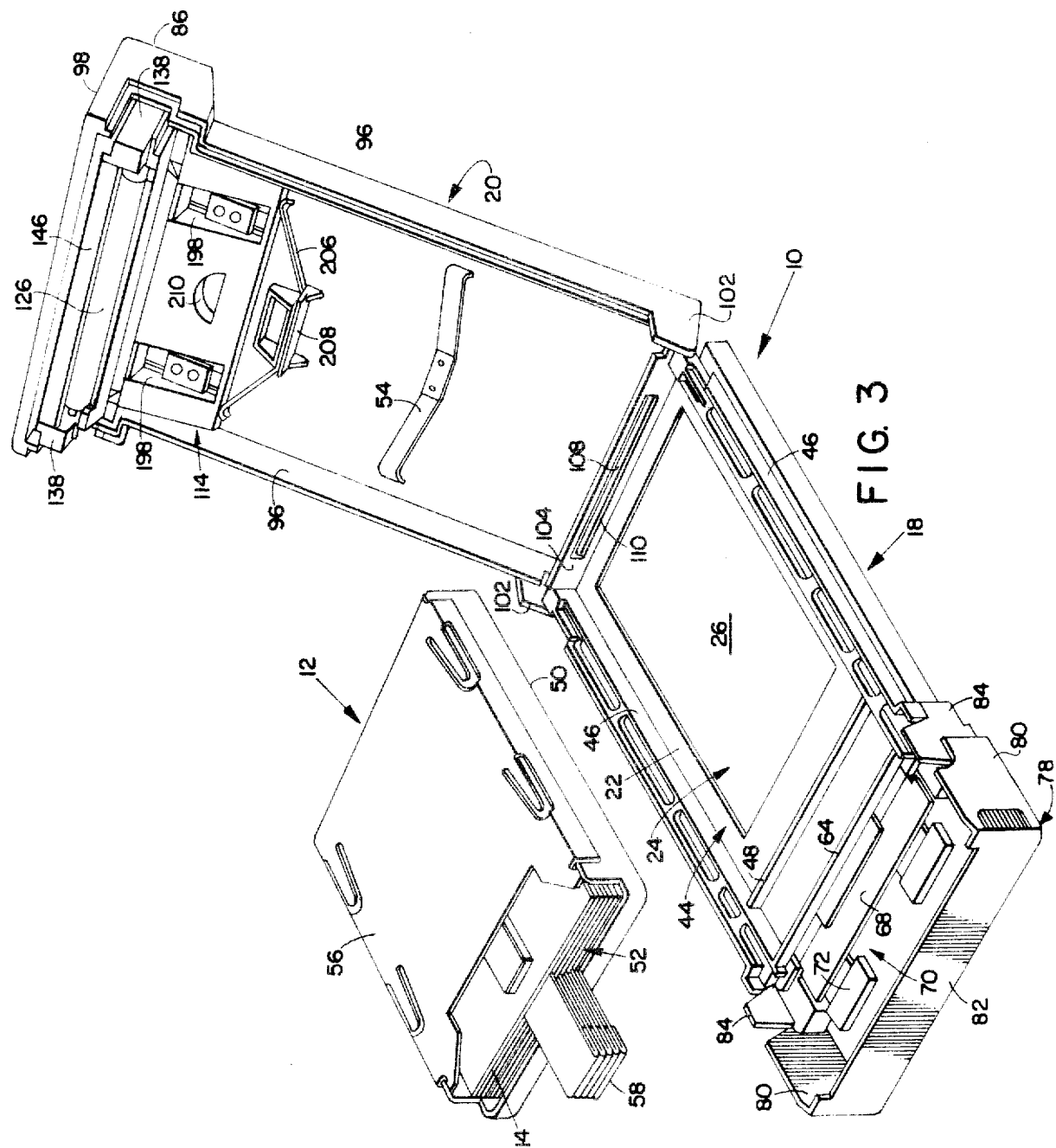
FIG. 3 is a perspective view of the camera back, shown in its open position, and a film pack holding a plurality of film units therein.

A self-developing camera back 10, embodying the present invention, is shown in its closed operative position in FIGS. 1 and 2 and its open inoperative position in FIG. 3 for receiving a film container or pack 12 holding a plurality of self-developing film units 14 arranged in stacked relation therein.

Camera back 10 includes an elongated housing 16 defined by a forward housing section 18 and a rear housing section 20 pivotally coupled together at their respective trailing end portions for pivotal movement between the open and closed positions.

As best shown in FIGS. 1, 3 and 6, forward housing section 18 includes a forward wall 22 having a rectangular exposure aperture 24 therein which is selectively blocked and unblocked by a dark slide 26. Adjacent one end of exposure aperture 24 is a standard vertical locating rib 28 which fits into a corresponding recess 30 in the rear wall of the body 32 of a 4×5 view camera 34. When so positioned on camera 34, a trailing end wall 36 of forward housing section 18 is adjacent to a film holder locating stop 38 on camera body 32 and a wider leading end portion 40 of housing 16 mounting a film processing assembly 42 therein extends beyond the opposite end of camera body 32. Housing section 18 also includes upper and lower longitudinally extending channels 43 for receiving Graflok fittings provided on camera 34 for securing camera back 10 or a standard film holder thereto. Alternatively, camera 10 also may be used with view cameras having a spring loaded retaining plate which bears against rear housing section 20 for releasably supporting camera back 10 on view camera 34.

As most clearly shown in FIG. 3, forward housing section 18 includes an interior rectangular frame 44 disposed about exposure aperture 24 for receiving and supporting film pack 12. Frame 44 is defined by that portion of forward wall 22 about the periphery of aperture 24, the upstanding trailing end wall 36, portions of longitudinally extending and laterally spaced side walls 46 and an upstanding leading end cross bar 48. Frame 44 locates film pack 12 both longitudinally and laterally with respect to camera housing 16 so that a corresponding exposure aperture (not shown) in a forward wall 50 of pack 12 is in registration with exposure aperture 24 and an open end 52 of pack 12 through which film units 14 are advanced into operative engagement with the film processing assembly 42 is properly spaced therefrom. The forward wall 50 is urged against that part of frame 44 defined by forward wall 22 to accurately locate the forwardmost film unit 14 in pack 12 at an exposure position. Pack 12 is releasably retained in frame 44 by a spring member 54 mounted on rear housing section 20 that engages a rear wall 56 of pack 12 when housing sections 18 and 20 are in the closed position.

Each of the self-developing film units 14 includes a longitudinally extending pull tab 58 at its leading end. Following exposure of a forwardmost film unit, its pull tab 58 is withdrawn through a later-to-be-described opening in the leading end portion 40 of housing 16 for effecting the advancement of a corresponding film unit leader 60 (see FIG. 6) through a film withdrawal opening 62 at the leading end of housing 16. Once leader 60 is accessible, the user pulls on it to manually advance the film unit 14 between a pair of pressure-applying rollers on assembly 42 for releasing a supply of fluid processing composition from a rupturable pod at the leading end of the film unit and effecting distribution of the fluid between separable superposed positive and negative sheets in a well-known manner to initiate a development and diffusion transfer process.

The pull tabs 58 extend forwardly of frame 44 across a second upstanding cross bar 64 and over a laterally extending light shield member 68 in alignment with a central notch 70, in a handle portion 72 of dark slide 26 that provides clearance for the free ends of pull tabs 58.

As best shown in FIG. 6, the dark slide 26 is insertable into a longitudinally extending channel 74, disposed between forward wall 22 and receiving frame 44, through an open end 76 of channel 74 at the leading end portion 40 of housing section 16 below the light shield 68. Advantageously, dark slide 26 is inserted and withdrawn from the leading end of housing 16 rather than its trailing end so that trailing end wall 36 may be utilized, without interference from dark slide structure, for engaging the stop 38 on camera body 32. The handle portion 72 extends slightly beyond light shield 68 to facilitate manual manipulation of dark slide 26. As best shown in FIG. 3, when dark slide 26 is fully inserted, notch 70 provides clearance for the pull tabs 58.

Housing sections 18 and 20 are releasably latched in the closed position at the leading end 40 of housing section 16 by a bail latch member 78 movable between the unlatching position of FIG. 3 and the latching position of FIGS. 1, 2 and 6. Latch 78 is defined by a pair of opposed laterally spaced side members 80 that are joined together by an integrally formed top cross member 82 and a notched leading end wall 83. The lower portions of side members 80 are pivotally coupled to leading end side wall extensions 84 on forward housing section 18 by any suitable means such as pivot pins (not shown). When in the latching position, the cross member 82 engages the exterior of a rear wall section 86 of rear housing section 20 so that a depending projection 88 on the interior of cross member 82 fits into an integrally formed recess or detent 90 on wall section 86. In the unlatching position of FIG. 3, cross member 82 is disengaged from rear wall section 86 allowing movement of the forward and rear housing sections to the open position. It will be noted that by mounting bail latch member 78 on housing section 18 rather than on housing section 20, the latching cross member 82 is positioned away from the area where the pull tabs 58 project out of housing 16 so that the latching structure does not interfere with manipulation of the pull tabs 58 or the dark slide 26.

The rear housing section 20 includes a rear wall portion, defined by an elongated section 92, a transition section 94 and the previously-noted section 86; a pair of laterally spaced side walls 96; a leading end wall section 98 and at trailing end wall section 100. The trailing end portions 102 of side walls 96 are pivotally connected to an upper extension 104 of forward housing section trailing end wall 36 by means of a pair of blind pivot pins 106 (only one of which is shown in FIG. 6) that are held in place by a resilient keeper bar 108 arranged in a slot 110 that communicates with the guideways for pins 106. In the closed position, side walls 96 cooperate with complementary structure on the side walls 46 of forward housing section 18 to form a labyrinth light seal along the sides of housing section 16.

As most clearly shown in FIGS. 4 and 6, wall sections 94, 86, 98 and the leading end portions of side walls 96, cooperate to define a recess 112 at the leading end portion of rear housing section 18 for receiving and supporting at least a later-to-be-described base portion of film processing assembly 42. As will become apparent later, a retaining member 114, slidably mounted on rear wall section 92 for movement between a retaining position for retaining the base section of assembly 42 in recess 112 and a retracted position permitting the base section to be moved in and out of recess 112 so that the processing assembly 42 may be removed for cleaning purposes.

As best shown in FIGS. 1 and 3, forward wall section 98 has a pivotally mounted door 116 thereon covering the film withdrawal opening 62 formed in wall section 98. This view also shows that the notched leading end wall 83 of bail latch member 78 provides access for door 116 and also contributes to the light sealing structure of camera back 10. When housing sections 18 and 20 are in the closed position, the structure at their corresponding leading ends, including portions of processing assembly 42, cooperate to define a second opening 120 in leading end portion 40 of housing 16 for the withdrawal of the pull tabs 58.

The film processing assembly 42 will now be described with reference to FIGS. 4 and 5. Assembly 42 includes a support frame 124; a pair of pressure-applying rollers 126 and 128; a pair of bearing block assemblies 130; an edge control bar 132; a first spring member 134; and a second spring member 136.

Support frame 124 is preferably a molded plastic piece part including a pair of opposed laterally spaced side members 138 joined together, above a lower base section portion of side members 138, by cross members including a first rearwardly facing cross member 140, a second rearwardly facing cross member 142 being positioned above and slightly to the front of cross member 140 and having a pair of integrally formed laterally spaced depending first edge control projections 144 thereon; and a third cross member 146 at the top of support frame 124. As best shown in FIG. 5, support frame 124 is open at its bottom end and each side member 138 includes a first channel 148 and a second channel 150 each having an open bottom end.

Each first channel 148 is configured to slidably receive and support one of the bearing block assemblies 130 inserted into channel 148 through its open end.

Each bearing block assembly 130 comprises a support member 152 having a fixed opening 154 therein for rotatably receiving an end 156 of a fixed axial shaft on roller 126; and an elongated key way slot 158 for receiving an end 160 of the axial shaft of roller 128 and also for receiving a sliding bearing block member 162. Movement of member 162 in key way slot 158 permits the space in which roller shaft end 160 is captured to expand and contract thereby mounting roller 128 for both rotation and movement toward and away from roller 126. As will be explained shortly, the movable bearing member 162 is adapted to be biased forwardly into support member 152 by a spring finger on first spring member 134.

The edge control bar 132 is an elongated structure having integrally molded therewith a pair of lateral end tabs 164 that are insertable into the second channels 150, through their open bottom ends, for slidably mounting edge control bar 132 behind cross member 140 for movement toward and away from the cross bar 142. Additionally, edge control bar 132 includes a pair of integrally molded and laterally spaced upstanding second edge control projections 166 that cooperate with projections 144, in response to a biasing force provided by spring member 136 on edge control bar 132, for applying a compressive pressure to lateral edge portions of the film unit 14 to prevent fluid leakage from the lateral edges of the two superposed sheets as the film unit 14 is advanced between the rollers 126 and 128. Also, the upper inclined surface 167 of bar 132, between projections 166, supports the center portion of the film unit negative sheet and tends to improve the uniformity of fluid distribution.

Spring member 134 is a sheet metal piece part having integrally formed thereon oppositely disposed sets of three laterally extending spring fingers. Each set of spring fingers includes a middle biasing finger 168 and a pair of mounting fingers 170 and 172 disposed on opposite sides of finger 168. Formed in a rearwardly extending tab portion 174 of spring member 134 is a centrally disposed triangular aperture 176 for frictionally receiving a bent central portion 178 of second spring member 136. In this manner, spring member 136 is mounted on spring member 134 such that its inclined spring arms 180 extend upwardly from spring member 134. The ends of spring arms 180 are configured to be captured in a laterally extending slot 182 on the underside of edge control bar 132.

To assemble film processing assembly 42 the end tabs 164 of edge control bar 132 are slidably inserted into the second channels 150. Then the bearing block support members 152 are pressed onto the ends 156 of roller 126 and members 152 are slidably inserted into the first channels 148. The ends 160 of the second roller 128 are slidably inserted into key way slots 158 followed by the bearing block slide members 162. With second spring member 136 mounted on first spring member 134, the middle biasing fingers 168 are deflected rearwardly (to the right as viewed in FIG. 5) with a special assembly tool (not shown). Then, the ends of mounting fingers 170 and 172 are slidably inserted into a pair of corresponding mounting apertures 184 and 186 integrally formed in the base portion of each support frame side members 138 on opposite sides of the first channel member 148. The tool is then removed releasing the biasing fingers 168 which engage and press on the movable bearing block members 162 as shown in FIG. 7. Thus, biasing fingers 168 provide a biasing force for urging roller 128 towards roller 126 and they also releasably retain the bearing block assemblies 130 in the first channels 148. When spring member 134 is so positioned, the ends of spring arms 180 on second spring member 134 extend into channel 182 providing a biasing force on edge control member 132 which both retains it in the second channels 150 and provides a biasing force thereon urging it toward cross member 142.

It will also be noted that the base portion of the side members 138 includes a pair of laterally spaced integrally formed projections or steps 188 adjacent the bottom of cross member 140. As will become apparent later, projections 188 will cooperate with the movable retaining member 114 for releasably retaining the base section of film processing assembly 42 in recess 112.

Figure 4:
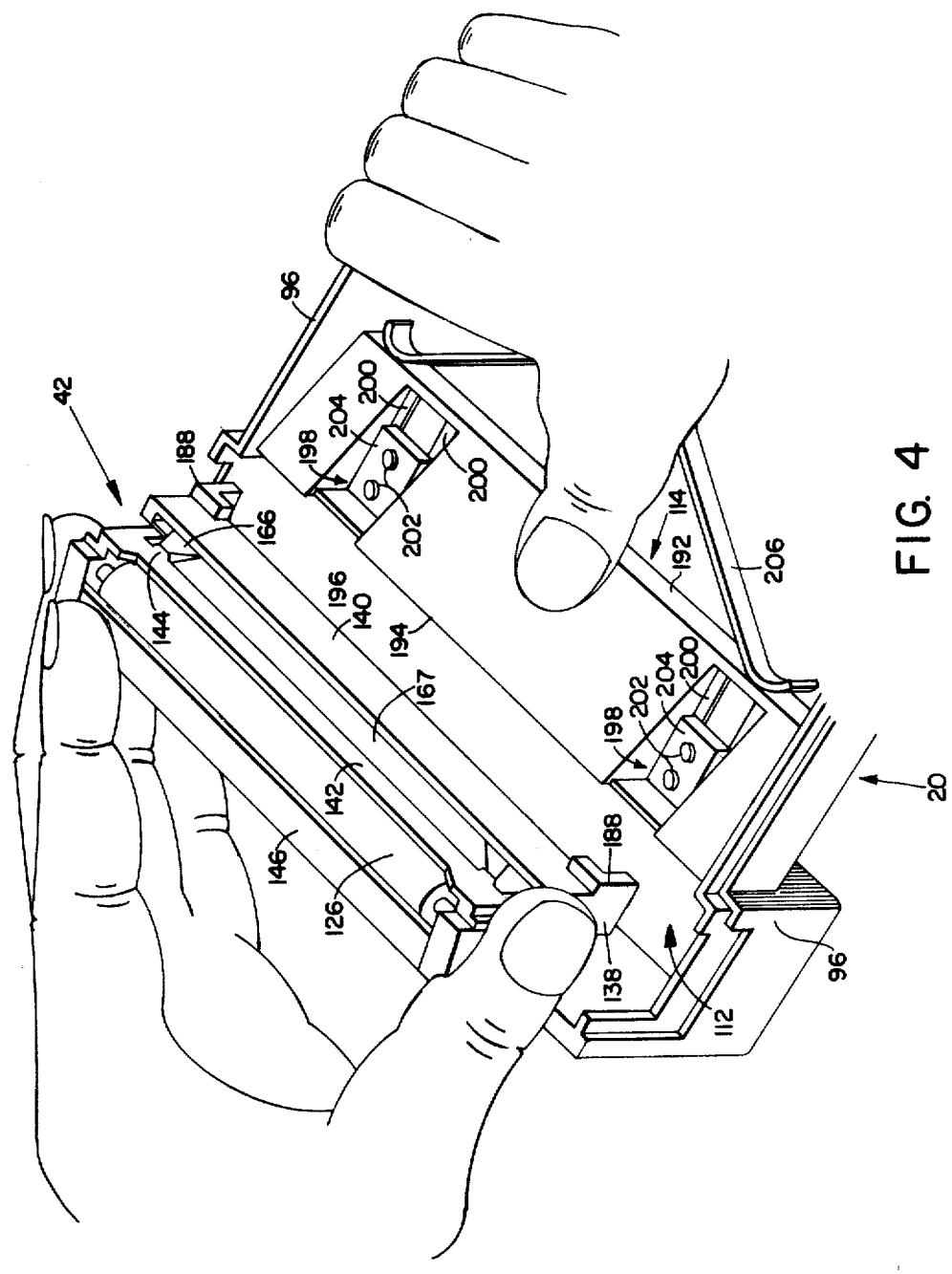
FIG. 4 is a perspective view of a portion of the camera back showing the film processing assembly positioned over a recess for receiving a base portion of the assembly with a retaining member shown in its retracted position.
Figure 5:
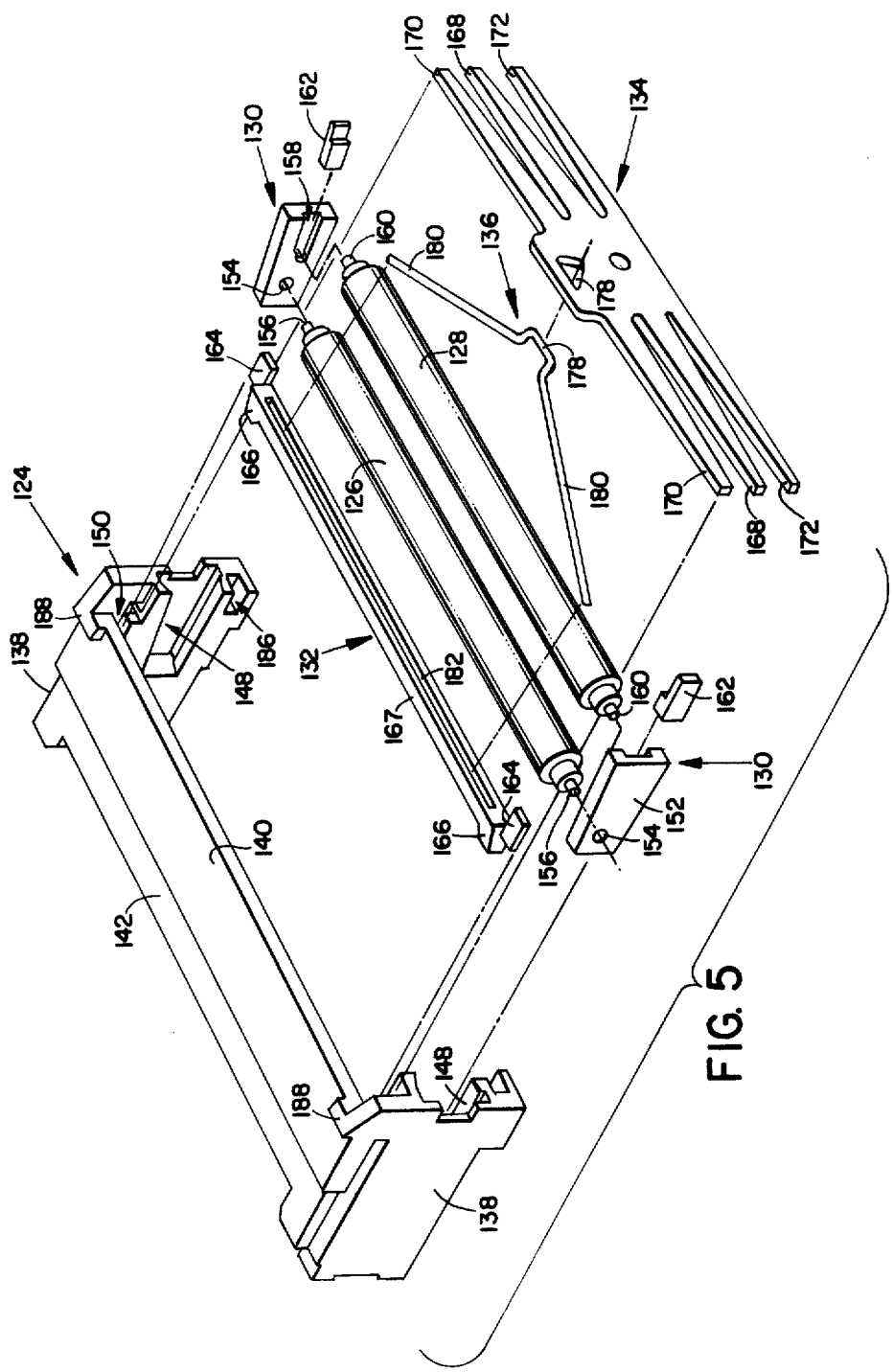
FIG. 5 is an exploded perspective view of the film processing assembly shown in FIG. 4.

As best shown in FIGS. 3, 4 and 6, the retaining member 114 is a generally wedge-shaped piece part including a planar rear wall 190 adapted to slide longitudinally along the interior surface of rear wall section 92; a short trailing end wall 192; a taller leading end wall 194; and an inclined forward wall or surface 196 sloping upwardly from the top of trailing end wall 192 to the top of leading end wall 194. Integrally formed in retaining member 114 is a pair of laterally spaced mounting slots 198 each having a pair of inwardly extending mounting flanges 200 along opposite sides thereof adjacent bottom wall 190. Aligned with the center of slots 198 and securely attached to rear wall 92 are two sets of mounting pins 202 each having a slide cap 204 thereon that extends outwardly so that its lateral edges cover the mounting flanges 200 in slots 198. In this manner, retaining member 114 is slidably mounted on wall section 92 adjacent a laterally extending edge of recess 112 for sliding motion in a longitudinal direction between a forward retaining position and a retracted position. Member 114 is biased forwardly toward the retaining position by a leaf spring member 206 having its central portion captured in a spring support member 208 mounted on the interior or rear wall section 92.

As most clearly shown in FIG. 6, the recess 112 in leading end section 40 is transversely offset with respect to the film advancement path extending from the open end 52 of the film pack 12, between the edge control structure and pressure-applying rollers, and out through the film withdrawal opening 62. When the base portion of support frame 124 is inserted into recess 112 the bottom edges of side support members 138 bear against the interior surface of wall section 86 so that the edge control structure and pressure-applying rollers extend into the film advancement path. Also, when the support frame 124 is in this operative position, the projections 188 are adjacent to the transition wall section 94 with the top flat edges of projection 188 in substantially flush relationship with the interior surface of rear wall section 92. When retaining member 114 is in its forwardmost retaining position, the leading end of bottom wall 190 extends over and bears against the top surface of projections 188 and the leading end wall 194 is adjacent to the facing surface of cross member 140. Thus, in the retaining position the leading end or retaining member extends forwardly over a portion of recess 112 in the path of projections 188 thereby blocking removal of the base section of film processing assembly 42 therefrom. When moved rearwardly to the retracted position, the forward end of retaining member 114 is retracted from the edge of recess 112 and is located out of the path of travel of projections 188 thereby unblocking passage of the base section of assembly 42 into and out of recess 112 so that film processing assembly 42 may be readily removed from housing 16. In a preferred embodiment, the retaining member 114 includes a centrally disposed crescent-shaped recess 210 providing a convenient finger or thumbhold thereon to facilitate the manual movement of member 114 to the retracted position.

In addition to releasably retaining film processing assembly 42 in recess 112, retaining member 114 serves a second function. As best shown in FIG. 6, the inclined forward surface 196 serves as a guide ramp for guiding the film unit 14 along its path of advancement into the film processing assembly 42.

In use, the bail latch 78 is pivoted to its unlatching position and the forward and rear housing sections 18 and 20 are pivoted to the open position. With dark slide 26 in its fully inserted blocking position, a film pack 12 is inserted into receiving frame 44 after which housing 16 is closed and relatched by moving bail latch member 78 to its latching position. Although not shown in the drawing, an opaque paper dark slide which covers the exposure aperture in film pack 12 is then withdrawn through the pull tab opening 120.

The camera back 10 is then mounted on camera 34 in the manner previously noted and dark slide 26 is fully withdrawn from channel 74 through leading end opening 76 to uncover the exposure aperture in forward wall 22.

Following exposure of the forwardmost film unit 14 in pack 12, its corresponding tab 58 is manually pulled out through leading end opening 120. The withdrawal of pull tab 58 causes a leader 60 on the forward end of the exposed film unit to be fed through the processing assembly 42 and out through the film withdrawal opening 62. The operator then manually pulls on the leader to advance the exposed film unit through processing assembly 42 to effect fluid distribution and removal of the film unit from camera back 10. Following a suitable imbibition period, the operator then manually strips the positive sheet from the negative to uncover a positive image print on the forward side of the positive sheet.

Should the operator wish to remove camera back 10 from camera 34 before all of the film units 14 in pack 12 have been exposed, he merely reinserts the dark slide 26 into channel 74 to block exposure aperture 24 and then removes camera back 10 from camera body 32.

If it is necessary to clean the rollers, assembly 42 may be removed from recess 112 by manually moving retaining member 114 to the retracted position and lifting assembly 42 out of the recess.

While the processing assembly 42 and the cooperating structure for releasably mounting it in housing 16 have been illustrated as forming part of a self-developing camera back 10, those skilled in the art will recognize that the disclosed film processing arrangement and structure may be incorporated into other suitable photographic apparatus including self-developing cameras.

This invention may be practiced or embodied in still other ways without departing from the spirit or essential character thereof. The preferred embodiment described and shown herein is therefore illustrative and not restrictive, the scope of the invention being indicated by the appended claims and all variations which come within the meaning of the claims are intended to be embraced therein.

What is claimed is:

1. Photographic apparatus for effecting distribution of a fluid processing composition between superposed sheets of a self-developing film unit, said apparatus comprising:
    an elongated housing including a forward wall having an exposure aperture therein and an end wall having a film withdrawal opening therein;
    means for supporting such a film unit at an exposure position in registration with said exposure aperture and for movement, after exposure, along a longitudinally extending film advancement path through said film withdrawal opening;
    means for processing the film unit including a support member having a base section and a pair of pressure applying members mounted on said support member and between which the film unit is moved as the film unit is advanced along said path for effecting fluid distribution;
    means for defining a recess within said housing between said exposure aperture and said withdrawal opening and being transversely offset with respect to said path for releasably receiving and supporting at least a portion of said base section so that said pressure-applying means are operatively positioned in said path; and
    means movable between a retaining position for releasably retaining said base section in said recess and a retracted position unblocking movement of said base section portion into and out of said recess thereby allowing said processing means to be removed from said housing, said movable retaining means also including means for guiding the film unit along said path towards said pressure applying means.

2. The apparatus of claim 1 wherein said retaining means includes a retaining member mounted for sliding movement between said retaining and retracted positions and said guide means includes a guide surface on said retaining member in facing relation to said path and being inclined toward said pressure applying means in the direction of film advancement.

3. The apparatus of claim 2 further including means for biasing said retaining member toward said retaining position and wherein said retaining member includes a finger recess for facilitating manual movement to said retracted position.

4. The apparatus of claim 2 further including a rear housing wall section oppositely spaced from said forward wall and wherein said retaining member is mounted on said rear wall section.

5. The apparatus of claim 2 wherein said retaining member is mounted for longitudinal movement.

6. The apparatus of claim 1 wherein said base section portion includes a projection thereon located adjacent to and substantially flush with an edge of said recess when said base section portion is located therein and said movable retaining means includes a retaining member having a portion that extends beyond said edge and over said projection when said retaining member is in said retaining position and is retracted from said projection and said edge when in said retracted position.

7. A film processing assembly for use in a photographic apparatus for effecting distribution of a fluid processing composition between superposed sheets of a self-developing film unit, said assembly comprising:
    a support frame including a pair of opposed laterally spaced side members joined by a cross member having a pair of first laterally spaced edge control projections thereon, said side members each including first and second channels having an open end;
    a pair of pressure applying rollers between which the film unit is advanced for effecting fluid distribution;
    a pair of bearing block assemblies, each configured to be slidably inserted into one of said first channels through its open end, for rotatably mounting both of said rollers between said side members and also mounting one of said rollers for movement toward and away from the other of said rollers;
    an edge control bar having a pair of laterally spaced second edge control projections thereon configured to cooperate with said first edge control projections for applying a compressive pressure to lateral edge portions of the film unit to prevent fluid leakage therefrom as the film unit is advanced between said rollers, said edge control bar including lateral end portions configured to be slidably inserted into said second channels through their open ends thereby mounting said edge control bar for movement toward and away from said cross bar; and
    resilient means coupled to said side members for retaining said bearing block assemblies in said first channels and biasing said one roller toward said other roller and for retaining said end portions of said edge control bar in said second channels and biasing said edge control bar toward said cross bar.

8. The assembly of claim 7 wherein said resilient means includes a first spring member extending between and coupled to side members and including a pair of spring fingers for engaging and applying a biasing force to said pair of bearing block assemblies.

9. The assembly of claim 8 wherein said resilieint means further includes a second spring member mounted on said first spring member for applying a biasing force to said edge control bar.

10. The assembly of claim 8 wherein said first spring member further includes a pair of mounting fingers associated with each of said spring fingers and each of said side members includes a pair of openings therein for receiving end portions of corresponding pairs of said mounting fingers.

11. The assembly of claim 10 wherein said support frame is an integrally molded structure.

12. The assembly of claim 7 wherein side members include base portions configured to be received and supported in a recess in the photographic apparatus and each member includes a projection thereon for cooperating with a movable member in said apparatus for releasably retaining said base portions in said recess.

13. A self-developing camera back attachable to a camera body for supporting a self-developing film unit supplied in a pack in position for exposure and thereafter effecting distribution of a fluid processing composition between superposed sheet elements of the exposed film unit, said camera back comprising:

an elongated housing including forward and rear housing sections having corresponding leading and trailing end portions being pivotally coupled at said trailing end portions for movement between a closed operative position and an inoperative open position, said forward section having a forward wall with an exposure aperture therein;

a receiving frame on said forward housing section disposed about said exposure aperture for receiving a pack holding a stack of such film units and locating the forwardmost film unit at the exposure position;

means for defining an elongated channel within said forward housing section extending between said forward wall and said receiving frame and having an open end at said leading end portion of said forward housing section;

a dark slide configured to be slidably inserted into said channel through its open end for selectively blocking and unblocking said exposure aperture and including a handle portion that extends outwardly from said leading end portion of said forward housing section when said dark slide is fully inserted in said channel;

means for defining a film withdrawal opening at said leading end portion of said rear housing section;

a film processing assembly including a pair of pressure applying rollers between which the film unit is advanced to effect fluid distribution, said processing assembly being mounted on said leading end portion of said rear housing section adjacent said withdrawal opening so that said rollers are positioned in a film advancement path extending from one end of the pack, between said rollers and out through said withdrawal slot when said forward and rear housing sections are in said closed position; and a bail latch member including a pair of opposed laterally spaced side members joined by a cross member, said side members being pivotally coupled to said leading end portion of said forward housing section so that said bail latch member is mounted for pivotal movement between a latching position wherein said cross member engages said leading end portion of said rear housing section to releasably retain said forward and rear housing sections in said closed position and an unlatching position wherein said cross member is disengaged from said leading end portion of said rear housing section to allow movement of said forward and rear housing sections to said open position.

14. The camera back of claim 13 wherein each film unit in the pack includes a pull tab for advancing a film leader along said film exit path, said forward and rear housing sections include cooperating means on their respective leading end portions for defining a pull tab exit opening adjacent said film withdrawal opening when said forward and rear housing sections are in said closed position, and said dark slide handle portion includes a notch providing clearance for a portion of the pull tabs extending out of said housing through said exit opening when said dark slide is in said fully inserted position.

15. The camera back of claim 14 wherein said rear housing section includes a recess at its said leading end portion for releasably receiving a base portion of said film processing assembly and said camera further includes means mounted on said rear housing section for movement between a retaining position for retaining said base section in said recess and a retracted position for unblocking movement of said base section into and out of said recess so that said processing assembly may be removed from said housing.

16. The camera back of claim 15 wherein said retaining means includes a retaining member additionally including a guide surface for guiding a film unit toward said rollers.

* * * * *